(12) United States Patent
Austin

(10) Patent No.: US 7,195,300 B2
(45) Date of Patent: Mar. 27, 2007

(54) TAILGATE COUNTERBALANCING HINGE

(75) Inventor: Donald Mossom Austin, Perkinsfield (CA)

(73) Assignee: M&C Corporation, Sterling Heights, MI (US)

( * ) Notice: Subject to any disclaimer, the term of this patent is extended or adjusted under 35 U.S.C. 154(b) by 261 days.

(21) Appl. No.: 11/075,757

(22) Filed: Mar. 10, 2005

(65) Prior Publication Data

US 2005/0200150 A1 Sep. 15, 2005

Related U.S. Application Data

(60) Provisional application No. 60/552,063, filed on Mar. 10, 2004.

(51) Int. Cl.
*B62D 33/03* (2006.01)
(52) U.S. Cl. .......................... 296/57.1; 16/75; 16/308; 49/386
(58) Field of Classification Search ............... 296/57.1, 296/59, 146.1; 16/75, 308; 49/386, 389
See application file for complete search history.

(56) References Cited

U.S. PATENT DOCUMENTS

| | | | |
|---|---|---|---|
| 2,395,456 A | 2/1946 | Bunker | |
| 2,733,476 A | 2/1956 | Eck | |
| 2,799,891 A | 7/1957 | Ragsdale | |
| 2,810,153 A | 10/1957 | Semar | |
| 2,984,517 A | 5/1961 | Farrow et al. | |
| 3,031,225 A | 4/1962 | Saffer et al. | |
| 3,085,286 A | 4/1963 | Whitehouse et al. | |
| 3,122,775 A | 3/1964 | Pulleyblank | |
| 3,146,847 A | 9/1964 | Rutman et al. | |
| 3,166,783 A | 1/1965 | Mackie et al. | |
| 3,336,070 A | 8/1967 | Jackson | |
| 3,370,317 A | 2/1968 | Marchione | |
| 3,402,508 A | 9/1968 | Kessler | |
| 3,643,378 A | 2/1972 | Velavicius et al. | |
| 3,649,067 A | 3/1972 | Louton, Jr. | |
| 3,695,678 A | 10/1972 | Gergoe | |
| 3,699,716 A | 10/1972 | Wanlass | |
| 3,787,923 A | 1/1974 | Peterson | |
| 4,143,904 A | 3/1979 | Cooper et al. | |
| 4,291,501 A | 9/1981 | Steinberg et al. | |
| 4,378,658 A | 4/1983 | DeLorean | |
| 4,589,164 A | 5/1986 | Leonard | |
| 4,701,977 A | 10/1987 | Hori et al. | |
| 4,702,511 A | 10/1987 | Olins | |
| 4,787,809 A | 11/1988 | Zroslik | |
| 4,845,811 A | 7/1989 | Fargnier | |
| 4,905,347 A | 3/1990 | Worth | |
| 5,039,154 A | 8/1991 | Lewis | |
| 5,358,301 A | 10/1994 | Konchan et al. | |
| D370,453 S | 6/1996 | Shortman et al. | |
| 5,606,773 A | 3/1997 | Shappell | |
| 5,641,262 A | 6/1997 | Dunlop et al. | |
| 5,787,549 A | 8/1998 | Soderlund | |
| 5,988,724 A | 11/1999 | Wolda | |
| 6,283,463 B1 | 9/2001 | Park | |
| 6,769,729 B1 | 8/2004 | Bruford et al. | |
| 6,793,263 B1 | 9/2004 | Bruford et al. | |

*Primary Examiner*—Lori L. Lyjak
(74) *Attorney, Agent, or Firm*—Nixon & Vanderhye P.C.

(57) ABSTRACT

A tailgate counterbalancing hinge assembly includes a linear torque rod, a first end assembly and a second end assembly secured to the torque rod. One end assembly pivotally supports the tailgate while permitting a torque rod end to be rigidly coupled to the tailgate for movement with the tailgate about a pivot axis. The other end assembly also pivotally supports the tailgate and permits the other end of the torque rod to be rigidly connected to the vehicle body. The assemblies are easily mounted in the vehicle by means of brackets secured to the tailgate, and a vehicle body hinge pin combines bushings with an aligned, elongated key to simplify installation and removal of the counterbalancing hinge assembly.

30 Claims, 2 Drawing Sheets

TAILGATE COUNTERBALANCING HINGE

This application claims the benefit of Provisional Application No. 60/552,063, filed Mar. 10, 2004, the entire contents of which are hereby incorporated by reference in this application.

FIELD OF THE INVENTION

The present invention relates to vehicle body closure panels with a counterbalancing hinge having a straight torque rod with end assemblies forming a pivot connection between the closure panel and vehicle body pillars by keys designed to carry the tailgate and define an unbiased tailgate position permitting tailgate removal from the vehicle body.

BACKGROUND ART

Vehicle body closure members such as a tailgate are pivotally mounted between body side panels forming the pillars at the rear of the vehicle. The tailgate pivots about a hinge axis between a horizontal, open position and a vertical, closed position. Preferably, the mounting assemblies for the tailgate permit the tailgate to be removed, and this has been accomplished in a known construction when the tailgate is pivoted to a position between the fully open or fully closed position. For example, the tailgate may include hinge pins that extend outwardly along the hinge axis that removably connect into brackets carried on the truck body. When the tailgate is pivoted to a predetermined intermediate position, for example, 15° away from the fully closed position, at least one of the hinge pins slips through a slot in the connecting bracket as the tailgate is lifted at one end from the truck body.

Some of the tailgate mounting assemblies include a spring bias assist for assisting movement and counterbalancing the weight of a tailgate during opening or closing movements. One previously known mechanism in which a torque rod provides spring biasing between the tailgate and the body panel pillars carries the torque rod on assemblies that form the pivots for the tailgate. Since the torque rod forms a portion of the pivot assembly, the torque rod must be installed for the tailgate to pivot and thus complicates the assembly procedure. Moreover, the torque rod may require particularly configured ends that complicate production of the parts before assembly.

A previously known tailgate may use hinge pin trunions for pivoting and the torque rod is preformed and installed into the tailgate in a complex and intricate procedure. For example, during assembly of the tailgate, the stationary end of the rod has to be aligned with an aperture that exposes the end for attachment outside of the tailgate while the anchoring end is aligned with a reinforcement plate located inside the tailgate. All of the aligning must be performed while the torque rod is carried within the interior of the tailgate and the procedure may be difficult and time consuming. Moreover, numerous components are required to assemble the torque rod to the tailgate. Other types of springs used in place of the torque rod are difficult to install within the confines of tailgates made of inner and outer panels joined together before the hinge assembly is mounted. Moreover, such assemblies may be difficult to repair and replacement parts are complex and expensive.

SUMMARY OF THE INVENTION

The present invention overcomes the above-mentioned disadvantages by providing a tailgate counterbalancing hinge in a vehicle closure assembly that includes an axially elongated torque rod having first and second end assemblies, each end assembly having a bushing cup carried in a bracket attached to the tailgate and supported by keys attached to the vehicle body. At least one end assembly bushing is readily attachable to, and removable from, the torque rod. The keys may be aligned to define an initial installation position and a removal position.

Preferably, the first end assembly bushing pivots with the tailgate about a first support for pivotally carrying the tailgate adjacent to a body pillar. In that embodiment, the first support preferably includes an insert, and a key, preferably carried by a bracket on a body pillar. The second end assembly has a second support for pivotally carrying the bushing adjacent to a second body pillar. The second support preferably has a key carried by a bracket on a body pillar. In the preferred embodiment, a spriget combines the key with a mount for securing the key to a facing body panel, preferably a body pillar. A pivot body has a slot configured for reception of the key. The pivot body is received in an opening in the bushing cup that carries the pivot body. The torque rod has a first end securely received in the first end assembly for movement with the bushing cup, and a second end securely received in the second end assembly by the pivot body.

Preferably, the torque rod is secured with a set screw at at least one end, and preferably, has a faceted cross-section at at least one end. The faceted cross-section can be any cross-section having at least one surface discontinuity that prevents rotation within a correspondingly shaped, compatible piece. The torque rod cross-section may be longitudinally continuous for ease of manufacture of the torque rod, or a faceted cross-section may be formed only on parts of the rod.

The present invention also comprises a method for assembling a selectively removable tailgate to a vehicle body pillar at each end of the tailgate, wherein the hinge axis includes an axially elongated torque rod with pivot bodies carried in bushing cups held by brackets attached to the tailgate. At least end portions of the rod, preferably with a faceted cross-section are received in parts of the end assemblies. The method includes receiving a first end of the torque rod in a bushing cup with a stem having a faceted cross-section. The method also includes receiving a second end of the torque rod in a cup carrying a pivot body with a stem having a faceted cross-section, retaining the bushing cup with respect to the tailgate, and retaining the cup by slidably receiving the cup with respect to a key, preferably a spriget, fixed to a body pillar. By sliding the bushing cup over a key fixed to the vehicle body pillar by the mount, the pillar pivotally supports a bushing mounted on the tailgate.

These and other features of the present invention can best be understood from the following specification and drawings, the following of which is a brief description.

BRIEF DESCRIPTION OF THE DRAWINGS

The present invention will be more clearly understood by reference in the following detailed description of a preferred embodiment when read in conjunction with the accompanying drawings, in which like reference characters refer to like parts throughout the views, and in which.

DETAILED DESCRIPTION OF THE PREFERRED EMBODIMENT

Figure 1:
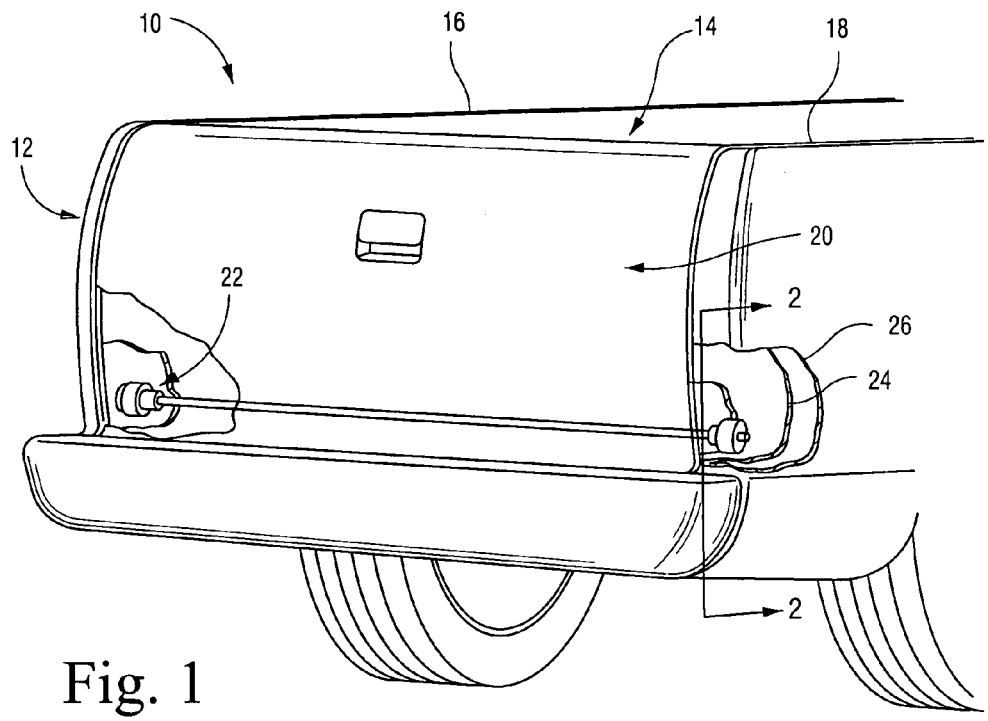
FIG. 1 is a perspective view of a vehicle body tailgate assembly.

Referring first to FIG. 1, a motor vehicle 10 is shown having a vehicle body 12 including a rear compartment or bed 14 enclosed by side panels 16 and 18, and a closure member in the form of a tailgate 20. A counterbalancing hinge assembly 22 pivotally supports the tailgate 20 between the sidewalls 16 and 18 in a manner to be described in greater detail below.

Figure 2:
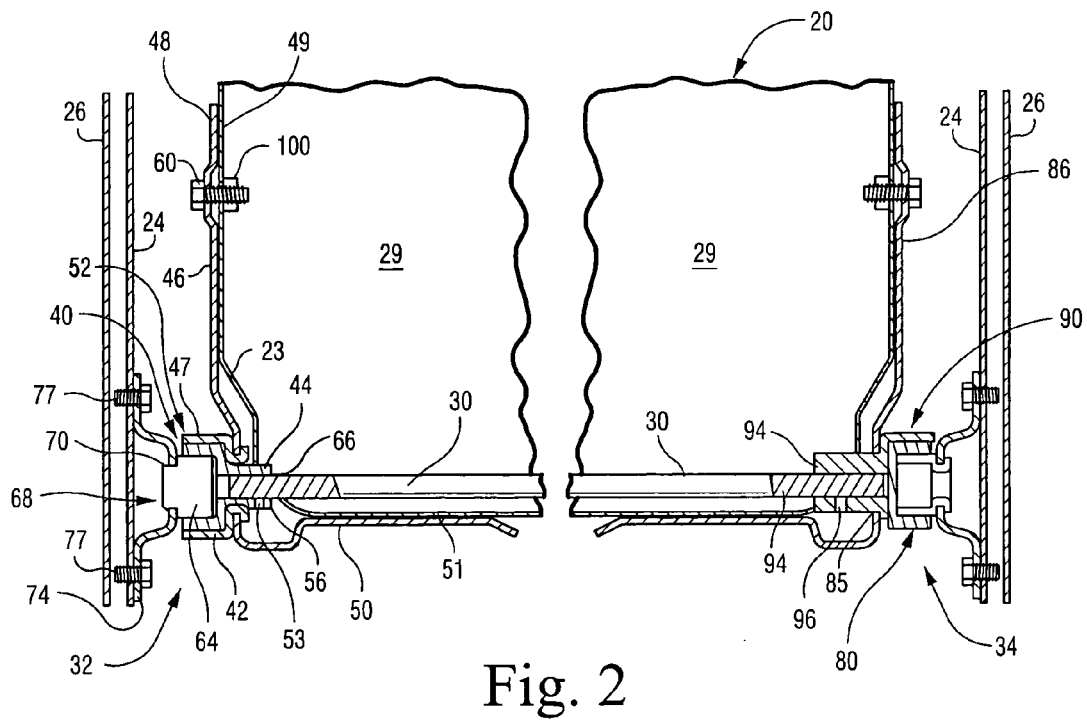
FIG. 2 is a sectional view taken through the tailgate assembly shown in FIG. 1.
Figure 3:
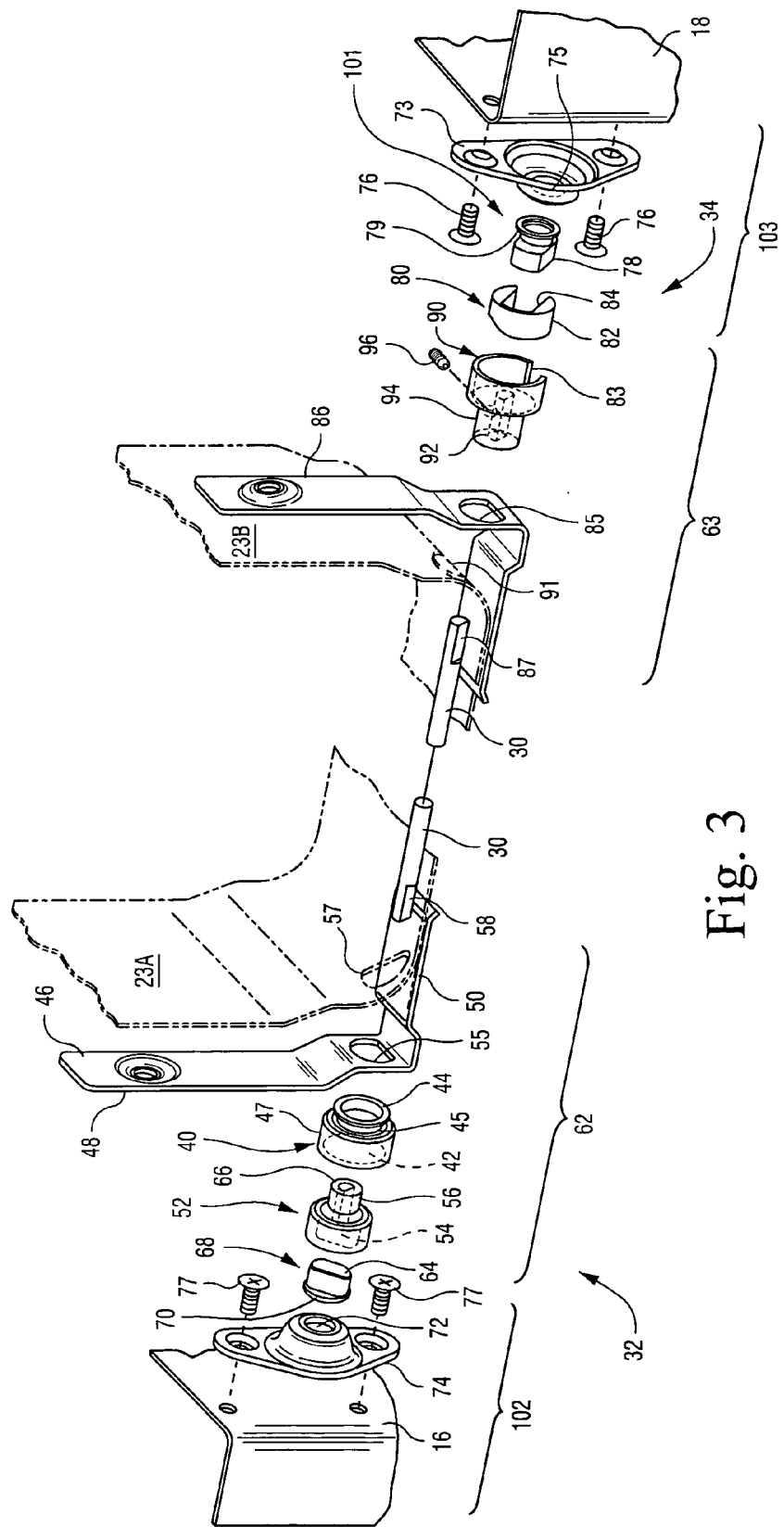
FIG. 3 is an enlarged exploded view of the hinge assembly employed in the tailgate assembly of FIGS. 1 and 2.

Tailgate 20 is pivotally supported between pillars formed by the side panels 16 and 18. Typically, as shown in the cutaway in FIG. 1, body panels, such as the side panels 16 and 18 and the tailgate 20, are formed by inner and outer panels 24 and 26, respectively, of sheet metal joined at the ends by overlapping flanges or the like that reinforce the planar expanses of the sheet metal forming the side panel. Of course, other materials may be used in constructing the vehicle body 12 and the hinge assembly 22 without departing from the present invention. As a result, although FIG. 1 shows a sheet metal construction in which separated panels 16 and 18 form pillars that support pivotal movement of tailgate 20, other structures may form structurally rigid pillars without departing from the invention. Similarly, the tailgate 20 may be made of an interior panel (not shown) and an exterior panel 29, as shown in FIG. 2. It should be noted, however, that the present invention is not dependent upon the vehicle construction to which it may be applied, particularly where hinge brackets, such as brackets 46 and 86 shown in FIGS. 2 and 3, provide proper mounting and positioning of pivot bushings 52 and 90, also shown in FIGS. 2 and 3, regardless of how brackets 46 and 86 are secured to tailgate 20.

The counterbalance hinge assembly 22 includes an axially elongated torque rod 30 that is aligned along a pivot axis between side panels 16 and 18. Torque rod 30 carries a first end assembly 32 and a second end assembly 34 that enable torque rod 30 to be secured with respect to vehicle body 12 at a first, left end, and with respect to tailgate 20 at a second, right end, respectively. It should be noted, however, that the left and right positions of the first and second end assemblies may be reversed without departing from the invention. Of course, other means of mounting end assemblies 32 and 34 at mating portions of body 12 and tailgate 20 can be used without departing from the scope of the present invention.

First end assembly 32 secures torque rod 30 to body 12, while pivotably supporting tailgate 20 at the left body pillar adjacent to left panel 24 of vehicle 10, as shown in FIG. 2. First end assembly 32 includes an end subassembly 62 that forms a left side vehicle hinge pin. Subassembly 62 includes a bushing 40 having a cylindrical chamber 42 and a mounting stem 44. Mounting stem 44 secures bushing 40 to a mounting bracket 46. Mounting bracket 46 is preferably formed to fit and attach to tailgate 20. For example, bracket 46 may have flanges 48 and 50 that engage a side edge 49 and a bottom portion 51 of tailgate 20, respectively. Bracket 46 carries end subassembly 62 that receives an end 58 of torque rod 30.

Subassembly 62 also secures torque rod 30 to body 12. For this purpose, preferably, end subassembly 62 also includes a pivot body 52, which is pivotally or rotatably inserted into chamber 42 of bushing 40. Pivot body 52 preferably includes an interior slot 54 and a protruding stem 56. Stem 56 has an interior bore 66 with a configuration that is preferably faceted to receive and retain a complementary faceted end 58 of torque rod 30. Pivot body 52 may also be welded or otherwise attached to end 58 of torque rod 30 without departing from the invention. Stem 56 may also include a set screw 53 that can be tightened against torque rod end 58, even when bore 66 and torque rod end 58 are not complementarily faceted. As shown in FIG. 3, bore 66 is preferably faceted in a manner that is complementary to torque rod end 58, so that it can serve to lock torque rod 30 end 58 within pivot body 52. For example, where torque rod 30 includes a polygonal shaped end 58, such as a hexagon, bore 66 may be complementarily configured to receive polygonal shaped end 58, and thereby prevent relative rotation between pivot body 52 and torque rod end 58. Where torque rod 30 includes a semicircle shaped end 58, bore 66 may again be complementarily configured to receive semicircular shaped end 58.

Preferably, bushing 40's stem 44 can be formed, for example, by cold heading, with a retaining shoulder 45 located after stem 44. Preferably, retaining shoulder 45 is inserted in opening 55 of bracket 46 to secure bushing 40 to bracket 46. In another preferred embodiment, a surface 47 of bushing 40 may fit in an enlarged opening 57 in tailgate end panel 23A so as to be aligned with the pivot axis extending through a portion of tailgate end panel 23A. Surface 47, or surface 45 of stem 44, may also be configured on its exterior, or otherwise fastened, to avoid relative rotation between pivot bushing 40 and tailgate end 23A so that pivot bushing 40 pivots with the tailgate 20. For example, surface 45 can have a shape that conforms to the shape of bracket opening 55, whereby relative rotation between surface 45 and opening 55, and thus between bushing 40 and tailgate 20, is prevented. Other bushing mountings may also be used without departing from the present invention.

First end assembly 32 also includes a mounting subassembly 102 for mounting a key 64 that is inserted in slot 54 of pivot body 52 to side panel 16 of vehicle 10. Preferably, mounting subassembly 102 includes a spriget 68 that combines key 64 with a mounting stem 70. Mounting stem 70 is adapted to be inserted in an opening 72 of a bracket 74 that is secured to side panel 16 by bolts, rivets, welding or the like on the pillar adjacent to tailgate 20. Preferably, a fastener, such as a nut or the like, may be positioned beneath bracket 74 for fastening stem 70 to bracket 74, and ultimately to side panel 16 when bracket 74 is screwed to side panel 16 by screws 77. Preferably, opening 72 of bracket 74 is threaded to receive and retain correspondingly threaded stem 70. It should be noted, however, that other attachment means, such as bolts or welding, can be used without departing from the invention.

Referring again to FIG. 3, second end assembly 34 secures torque rod 30 to tailgate 20, while also pivotally supporting tailgate 20 at the right body pillar adjacent to right side panel 24, as shown in FIG. 2. Second end assembly 34 includes a subassembly 63 that forms a right side vehicle hinge pin. Subassembly 63 includes a pivot bushing 90 having a stem 94 for attachment to bracket 86, and a bushing insert 80, which is pivotally or rotatably inserted into pivot bushing 90.

Pivot bushing 90 stem 94 preferably has a bore 92 that is adapted to receive, preferably in a press fit, faceted fit, or otherwise securing engagement, a right end 87 of torque rod 30. Pivot bushing 90 is mounted within an opening 85 of tailgate bracket 86. Preferably, opening 85 is formed in bracket 86 and aligned with a larger opening 91 in tailgate end 23B. Preferably, stem 94 of pivot bushing 90 is locked in correspondingly configured opening 85 of tailgate bracket 86. Stem 94 may be, for example, semi-cylindrical, whereby the configuration of opening 85 is also be semi-cylindrical to non-rotatably retain pivot bushing 90 in end bracket 86. Pivot bushing 90 may also be retained in opening 85 by a retainer engaging stem 94. Subassembly 63 further includes a bushing insert 80 that is inserted within pivot bushing 90. Bushing insert 80, in turn, includes a cylindrical body surface 82 that engages the interior of pivot bushing 90, and a radial slot 84 that interrupts body surface 82 and that is aligned with a slot 83 cut in the body of pivot bushing 90.

Second end assembly 34 also includes a mounting assembly 103 for mounting a second key 78 that is received in slot 83 of pivot bushing 90 and in slot 84 of bushing insert 80. As shown in FIG. 3, key 78 is part of a spriget 101 which includes a threaded stem 79 that is received in a threaded opening 75 of a second bracket 73 fastened to right side panel 18 of vehicle 10. Preferably, bracket 73 is screwed to side panel 18 by screws 76. However, it should again be noted that other attachment means, such as bolts or welding, can be used without departing from the present invention.

End assemblies 32 and 34 are constructed in a similar manner. Although certain components in assemblies 32 and 34 relating to the installation, rotation and removal of tailgate 20 may differ, other parts used in these assemblies are duplicates that can be used on either side of vehicle 10. For example, mounting subassemblies 102 and 103 include duplicate parts. Subassembly 102 preferably includes spriget 68, which combines key 64 with mounting stem 70 for securing key 64 to side panel 16 by means of a bracket 74 screwed to panel 16. Similarly, subassembly 103 preferably includes spriget 101, which combines key 78 with mounting stem 79 for securing key 78 to side panel 18 by means of a bracket 73 screwed to panel 18. Here, the only difference in these components is the alignment of key 64 versus the alignment of key 78 to facilitate the installation and removal of tailgate 20. In this regard, it should be noted that in FIG. 3, the use of separate reference numeral "78" for right hand key 78 is merely a label for following the installation description, and does not require structure different from, or the same as, key 64. Keys 64 and 78 preferably have an elongated shape, the elongated shape of key 78 being aligned in a direction intermediate the vertical, closed position and the horizontal, open positions of the tailgate 20, to define a removal direction along the elongated axis of key 78. But, even when the mounting assemblies 62, 63 are identical, or mirror images of each other, right hand key 78 may be aligned at a different angle to the vertical than left hand key 64. Of course, it should be noted that differences in the shapes of the components of assemblies 62 and 63 may be made without departing from the present invention.

When assembled as shown in FIG. 2, right hand end 87 of torque rod 30 is preferably locked in bore 92 in pivot bushing 90 by a set screw 96. The rigid connection of torque rod 30 to pivot bushing 90 so that torque rod 30 moves with tailgate 20 as it is rotated. Thus, as tailgate 20 is rotated between an upright, closed position and a horizontal, open position, torque rod 30 is forced to twist with tailgate 20's movement. Preferably, the unbiased position of torque rod 30 occurs when tailgate 20 is aligned with the elongated axis of right hand key 78, whereby spring tension is introduced to pivot the tailgate 20 away from the closed position when it is unlatched, and to raise it to the closed position when it has been unlatched from its open position. The latching of tailgate 20 in both the closed and the open positions could be done in a well known manner without departing from the present invention. For example, modifications outside of the structure of the counterbalance hinge assembly 63, such as over-center locking arms at the end of the tailgate, may be used at the open position.

Preferably, stem 94 is correspondingly sized to fit in opening 85 of tailgate panel attachment bracket 86 that is attached to the end panel 23B of tailgate 20 over an opening 91 (FIG. 3) in end panel 23B. Opening 91 is enlarged to receive stem 94 of bushing 90 to retain the right end 87 of torque rod 30 with respect to tailgate 20.

Rather than trying to form a properly sized and configured opening in tailgate panel 23A, bracket 48 is similarly provided with opening 55, which is positioned next to enlarged opening 57 (FIG. 3) in tailgate panel 23A. Openings 85 and 55 are aligned with the pivot axis extending through the tailgate 20.

Upper flange 48 is preferably bolted to tailgate 20 by a bolt and nut, 60 and 100, respectively, although welds or other fasteners could also be used without departing from the present invention. Opening 55 may be configured to avoid relative rotation between stem 44 and installation bracket 46 so that, when assembled, installation bracket 46 and pivot bushing 40 pivot with the tailgate 20. Stem 56 of pivot body 52 also includes chamber 66 that receives end 58 of the torque rod 30, as shown, so that pivot body 52 is effectively locked to the torque rod 30.

As a result, the parts of hinge assembly 22 may be assembled by attaching the torsion rod assembly 63 to the tailgate 20 and the mounting assembly 62 to the left side panel 16, respectively. The parts can be positioned before spring tension is applied to the counterbalance hinge assembly 22 by tightening set screw 96. First, bushings 40 and 90 are attached to brackets 46 and 86, and the brackets are attached to tailgate 20, preferably by welding, so that configured openings 55 and 85 are aligned over openings 57 and 91 in the ends of tailgate 20. Preferably, this enables configured openings 55 and 85 to be sized, shaped and positioned after tailgate 20 has been manufactured. This overcomes the difficulty of shaping, sizing and aligning the apertures of the original tailgate panel stampings. Set screw 96 is initially installed in a pre-production or fabrication assembly procedure, and left loose for tightening at the assembly plant. Torque rod 30, carrying pivot body 52 at end 58, is positioned so that end 87 is inserted through openings 55 and 57 to extend through tailgate 20. Torque rod 30 is inserted through bushing 90, already attached, for example, by welding or mechanical connection, to bracket 86 in a prior, pre-production or fabrication operation. The preferred mechanical connection may expand or turn the stem walls beyond the perimeter of opening 91 or 85 receiving stem 94. Set screw 96 is then tightened after end 87 of torque rod 30 is inserted into bore 92 in stem 94 of bushing 90.

With tailgate 20 holding torque rod 30 and subassemblies 62 and 63, and mounting subassemblies 102 and 103 mounted on a body side panels 16 and 18, respectively, tailgate 20 is positioned for installation. First, key 64 axis is aligned vertically, and tailgate 20 is moved so that pivot body 52 receives key 64 in its slot 54. Then tailgate 20 is pivoted to align slot 84 with key 78, mounted at an intermediate angle, for example 10° from the vertical. The tilted tailgate 20 is then lowered to engage key 78 in aligned slots 84 and 83 in bushing 90.

The assembly discussed above provides a mechanism for removably mounting a closure member, such as tailgate 20, between spaced apart body side panels, such as side panels 16 and 18, of a vehicle body that is generally consistent with the structures claimed in U.S. Pat. No. 5,988,724, but showing how the hinge can be simplified and the assembly improved by using a linear torque rod extending across both sides (lateral ends) of the tailgate. For example, each of the brackets 46 and 86 is a hinge bracket and is associated with a pivot bushing 40 and 90, respectively. In addition, the pivot bushings form a vehicle body hinge pin (lateral side) rotatably or pivotably engaged in the bushing, with the pivot bodies 90 and 52, and while sprigets 68 and 101 form a vehicle body hinge pin mounting for the side panels at the ends of the tailgate. The end assemblies 32 and 34 provide means for connecting the torque rod in driving engagement with the vehicle body hinge pin within the bushing and independently of the rotatable support of the tailgate by the bushing forming the hinge pin. Like the previously patented torque rod configured for mounting on a single end of the tailgate, the present invention permits a bushing to be received laterally downwardly over at least a portion of a vehicle body hinge pin where the closure member is in the removal position. Accordingly, the torque rod is twisted in tension when the closure member is pivoted to either the closed or open positions from the removal position. This tension provides a counterbalancing effort to assist with pivotal movement of the closure member. Nevertheless, the assembly permits facile removal of the closure member from the vehicle body when the closure member is in the removal position.

Although the present invention has been described in terms of a particular embodiment, it is not intended that the invention be limited to that embodiment. Modifications of the embodiment within the spirit of the invention will be apparent to those skilled in the art. The scope of the invention is defined by the claims that follow.

What is claimed is:

1. A mechanism for removably mounting a closure member between spaced apart first and second body side panels of a vehicle body for movement about a pivotal axis of said closure member between open, closed and removal positions, said mechanism comprising:
    first and second hinge brackets secured to opposite ends of the closure member, said first and second hinge brackets carrying, respectively, first and second bushings thereon with pivotal axes that are coincident with the axis of pivotal movement of said closure member;
    first and second vehicle body hinge pins for mounting on the first and second spaced apart body side panels, respectively, said first and second vehicle body hinge pins being coincident with the axis of pivotal movement of the closure member, and being configured to support said first and second bushings thereon, and in turn, said closure member on which said first and second hinge brackets are mounted;
    one of said first and second bushings having a laterally open slot therein positioned circumferentially to permit said bushing to laterally engage at least a portion of a corresponding one of said first and second vehicle body hinge pins when the closure member is in the removal position; and
    an axially elongated torque rod having a first end connected in driving engagement to said first hinge bracket and a second end for connecting the torque rod in driving engagement with said second vehicle body hinge pin within said second bushing and independently of rotatable support of said second bushing on said second hinge pin;
    said torque rod being twisted in tension when the closure member is pivoted to either the closed or open positions from the removal position, thereby providing a counterbalancing effect to assist with pivotal movement of the closure member, and permitting facile removal of the closure member from the vehicle body when the closure member is in the removal position.

2. The mechanism of claim 1, wherein at least a portion of each of first and second vehicle body hinge pins comprises a key for engaging the laterally open slot or another slot in said first and second bushings.

3. The mechanism of claim 1, wherein at least one end of said torque rod has a faceted cross-section and at least one of said bushings has a complementary faceted chamber for securely receiving said faceted end of said torque rod.

4. The mechanism of claim 3, wherein said faceted torque rod end and said faceted chamber are polygonal shaped for locked engagement with one another.

5. The mechanism of claim 3, wherein said faceted torque rod end and said faceted chamber are semicircular shaped for locked engagement with one another.

6. The mechanism of claim 1, wherein said torque rod is secured with a set screw at at least one end.

7. The mechanism of claim 1, wherein said torque rod is secured with set screws at each of its ends.

8. The mechanism of claim 3, wherein said faceted torque rod is secured with a set screw.

9. A tailgate counterbalancing hinge comprising:
    a first end assembly with a first support for pivotally carrying a tailgate adjacent to a first body panel, the first support comprising a pivot member with an elongated key, and a bushing pivotally received by said pivot member and including a stem for locking said bushing with respect to the tailgate;
    a second end assembly with a second support for pivotally carrying the tailgate adjacent to a second body panel opposed to the first body panel, the second support comprising a key with a mount for securing said key to said second body panel, a pivot body having a slot aligned for reception of said key, and a pivot bushing received in an opening in said tailgate and carrying said pivot body; and
    a torque rod having a first end secured for movement with said retainer bushing and a second end secured with respect to said pivot body.

10. The tailgate counterbalancing hinge of claim 9, wherein at least one end of said torque rod has a faceted cross-section.

11. The tailgate counterbalancing hinge of claim 10 wherein said faceted cross-section is polygonal shaped.

12. The tailgate counterbalancing hinge of claim 9 wherein said torque rod is secured in said retainer bushing by a set screw.

13. The tailgate counterbalancing hinge of claim 9 wherein said torque rod is secured in said pivot body by a set screw.

14. The tailgate counterbalancing hinge of claim 9 wherein said pivot body is rotatably received by said pivot bushing.

15. The tailgate counterbalancing hinge of claim 14 wherein said pivot body includes a stem and a retainer for locking said stem for rotation in said bushing.

16. The tailgate counterbalancing hinge of claim 10 wherein said faceted cross-section is semicircular shaped.

17. A vehicle body comprising:
a bed,
first and second pillar structures on first and second sides, respectively, of said bed,
a tailgate, and
a hinge structure pivotally and selectively removably supporting the tailgate at the first and second pillars, the hinge structure comprising:
   a first end assembly comprising a first support for pivotally carrying the tailgate adjacent to said first body pillar, the first support including a pivot member and a bushing pivotally received by said pivot member, said bushing including a stem for locking said bushing with respect to the tailgate;
   a second end assembly comprising a second support for pivotally carrying said tailgate adjacent to said second body pillar, the second support comprising:
      a spriget including an elongated key and a mounting stem for securing said spriget to said second body pillar,
      a pivot body including a slot aligned for reception of said key; and
      a pivot bushing received in an opening in said tailgate and carrying said pivot body; and
   a torque rod including a first end secured for movement with said bushing and a second end secured with respect to said pivot body.

18. The vehicle body of claim 17, wherein at least one end of said torque rod has a faceted cross-section and said pivot bushing has a complementary faceted chamber for securely receiving said faceted end of said torque rod, and wherein said faceted torque rod is secured with a set screw within said pivot bushing.

19. A method for assembling a selectively removable tailgate with a hinge structure to first and second vehicle body pillars positioned adjacent to first and second ends of said tailgate, said hinge structure including a torque rod with a first end having a faceted cross-section, the method comprising the steps of:
   inserting said first end of said torque rod in a bushing including a first chamber with a correspondingly faceted cross-section,
   inserting a second end of said torque rod in a pivot body including a second chamber with a correspondingly faceted cross-section,
   fastening said bushing to said first end of said tailgate,
   sliding said pivot body over a key attached to said second body pillar, and
   sliding said bushing over an aligned, elongated key attached to said first vehicle body pillar, and
   pivotally supporting said bushing by said elongated key.

20. The method of claim 19, wherein the step of fastening said bushing to said first end of said tailgate comprises installing a bracket having an opening in said first end of said tailgate, and inserting said bushing in said opening.

21. A tailgate counterbalancing hinge in a vehicle closure assembly comprising:
   a first end assembly including a first bushing being carried in a first bracket attached to the tailgate and being releasably supported by a first key attached to the vehicle's body,
   a second end assembly including a second sloted bushing being carried in a second bracket attached to an opposite end of the tailgate and being releasably supported by a second key laterally inserted in the second bushing and attached to an opposite side of the vehicle's body, and
   an axially elongated torque rod having first and second ends inserted into said first and second bushings, respectively, at least one of said first and second ends of the torque rod being securely inserted in a corresponding one of said first and second end assemblies,
   the first and second keys being separately aligned to define an initial installation position and a removal position for said tailgate.

22. The tailgate counterbalancing hinge of claim 21, wherein the first bushing pivots with the tailgate about a first support pivotally carrying the tailgate adjacent to a first body pillar, the first support including a first spriget carried by a first bracket on the first body pillar, the first spriget including the first key and a first mount for securing the first key to the first bracket, and
wherein the second bushing pivots with the tailgate about a second support pivotally carrying the tailgate adjacent to a second body pillar, the second support including a spriget carried by a second bracket on the second body pillar, the spriget including the second key and a mount for securing the second key to the second bracket.

23. The tailgate counterbalancing hinge of claim 22, further comprising first and second pivot bodies inserted in said first and second bushings, respectively, said first and second pivot bodies including first and second slots for receiving said first and second keys, respectively.

24. The tailgate counterbalancing hinge of claim 23, wherein the torque rod has a first end securely inserted in the first end assembly for movement with the first bushing, and a second end securely inserted in the second end assembly by the second pivot body.

25. The tailgate counterbalancing hinge of claim 21, wherein the torque rod is secured with a set screw at at least one end.

26. The tailgate counterbalancing hinge of claim 21, wherein the torque rod has a faceted cross-section at at least one end.

27. The tailgate counterbalancing hinge of claim 26, wherein the torque rod faceted cross-section has a cross-section having at least one surface discontinuity that prevents rotation within a correspondingly shaped, compatible bushing.

28. The tailgate counterbalancing hinge of claim 26, wherein the torque rod faceted cross-section is longitudinally continuous for ease of manufacture of the torque rod.

29. The tailgate counterbalancing hinge of claim 26, wherein the torque rod faceted cross-section is formed on only a part of the torque rod.

30. The tailgate counterbalancing hinge of claim 26 wherein the torque rod faceted cross-section is polygonal shaped or semicircular shaped.

* * * * *